Figure 1:
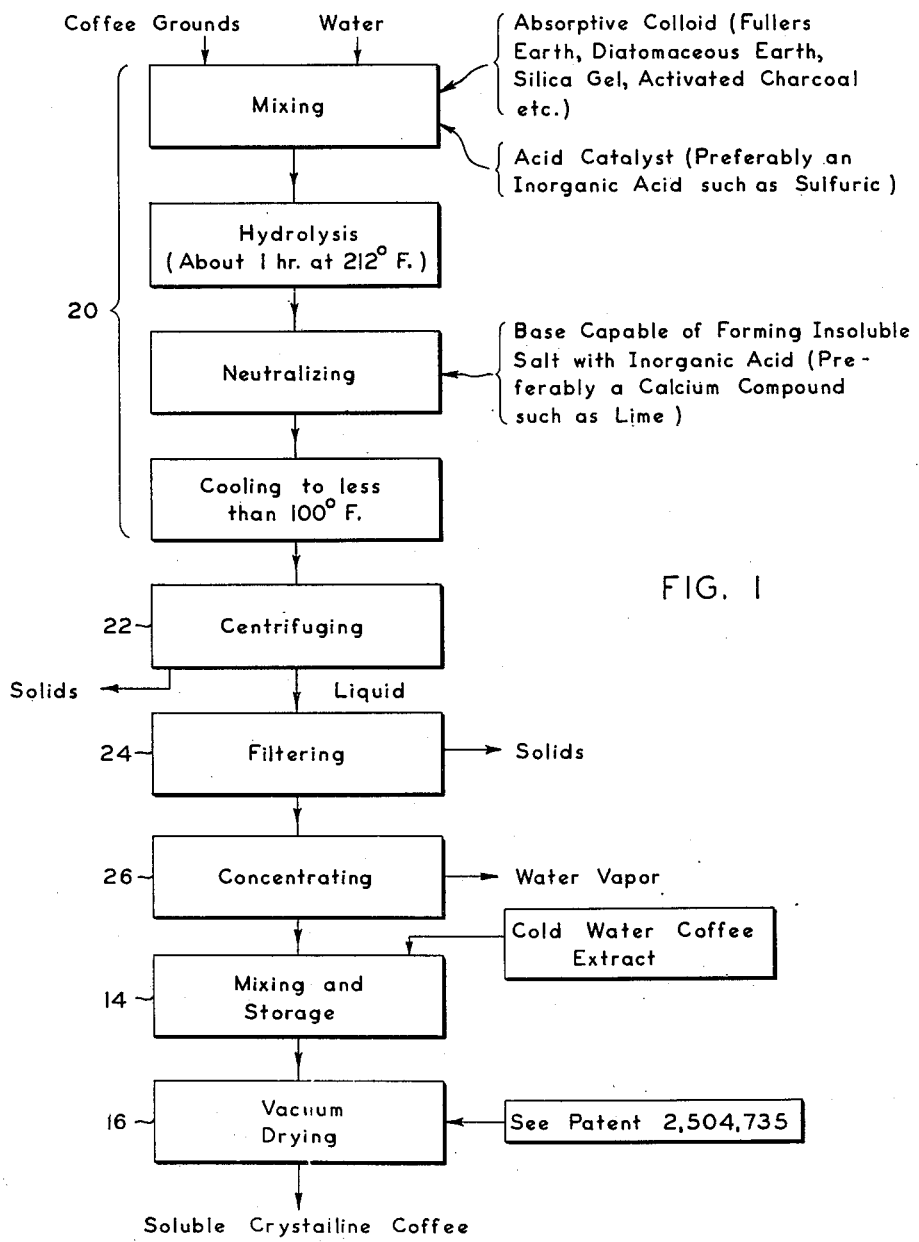

Oct. 30, 1951  P. J. CLOUGH ET AL  2,573,406
FOOD PRODUCT

Filed April 8, 1950  2 SHEETS—SHEET 1

INVENTORS
Philip J. Clough
Richard S. Morse
Edward G. Hellier
Robert A. Stauffer
BY
ATTORNEY Patented Oct. 30, 1951

2,573,406

UNITED STATES PATENT OFFICE 2,573,406

FOOD PRODUCT

Philip J. Clough, Reading, Richard S. Morse, Waban, Edward G. Hellier, Medfield, and Robert A. Stauffer, Weston, Mass., assignors to National Research Corporation, Cambridge, Mass., a corporation of Massachusetts Application April 8, 1950, Serial No. 154,772

8 Claims. (Cl. 99—71)

This invention relates to coffee and more particularly to improved processes for extracting and drying coffee to produce an improved soluble coffee.

In the manufacture of soluble coffee it has been discovered that extraction of the soluble coffee solids should be limited to about 18–20% of the weight of the roasted coffee bean. Extraction of higher amounts of the soluble coffee solids removes undesirable constituents which impart a bitter flavor to the coffee. Consequently, in the present invention the soluble coffee solids are extracted with relatively cool water (about 70°–100° F.) and are subsequently dried in accordance with the teachings in copending U. S. Patent No. 2,504,735 to give a crystalline coffee which contains essentially all of the desirable soluble coffee solids. However, extraction of low percentages of soluble coffee solids has the economic disadvantage of providing a soluble crystalline coffee having a bulk which compares unfavorably, from a cost standpoint, with soluble coffees presently available on the market. Additionally, a coffee beverage prepared from such a soluble crystalline coffee requires less than a teaspoon thereof to give a cup of normal strength beverage, and the resultant color of the beverage is somewhat lighter than that normally expected with a coffee beverage of equal strength.

Accordingly, it is an object of the present invention to provide an economical soluble coffee which includes essentially all of the desirable soluble coffee solids while containing essentially none of the undesirable coffee solids.

Another object of the invention is to provide a process for manufacturing soluble crystalline coffee which includes all of the desired coffee solids, with no taste-imparting additions, the soluble crystalline coffee having sufficient bulk to be economically competitive with coffees presently available on the market, and to require about one teaspoon of the soluble crystalline coffee for making one cup of coffee beverage.

Still another object of the invention is to provide a novel process of the type described above wherein the bulk of the coffee is increased by the use of an essentially tasteless derivative of coffee which has the property of being dried along with the taste-imparting soluble coffee solids to give a crystalline coffee which is immediately soluble in cold water, said tasteless derivative also having the property of absorbing some of the taste- and aroma-imparting elements that would ordinarily be lost in drying.

Still another object of the invention is to provide a process of the above type wherein the soluble tasteless coffee derivative added to the coffee extract has the ability of increasing the density of the color of the resultant coffee beverage to give the dark color normally associated with a coffee beverage of equal strength.

These and other objects of the invention will in part be obvious and will in part appear hereinafter.

The invention accordingly comprises the product possessing the features, properties and the relation of components and the process involving the several steps and the relation and the order of one or more of such steps with respect to each of the others which are exemplified in the following detailed disclosure, and the scope of the application of which will be indicated in the claims.

Figure 2:
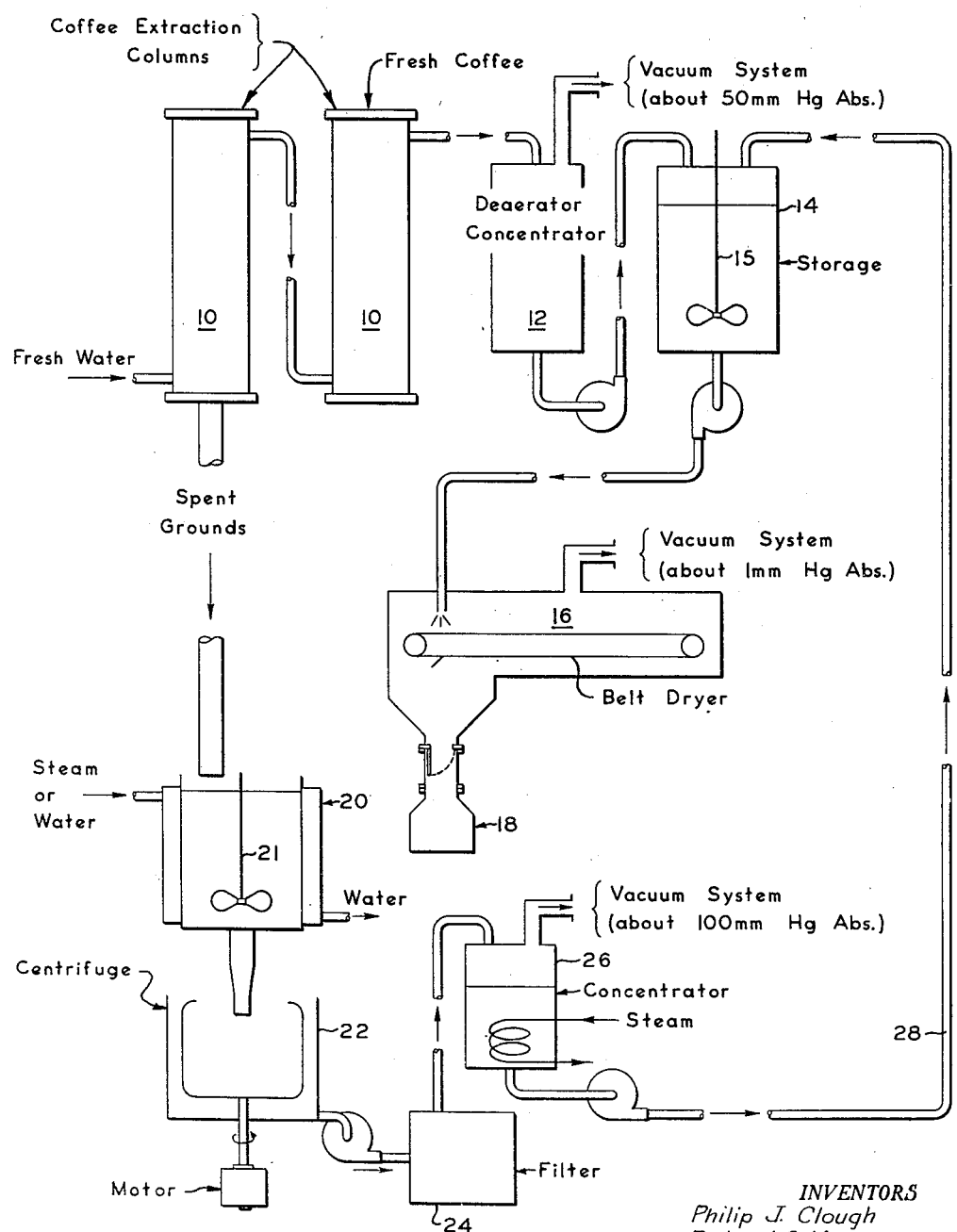

For a fuller understanding of the nature and objects of the invention, reference should be had to the following detailed description taken in connection with the accompanying drawings wherein:

Fig. 1 is a flow sheet showing a preferred process embodying the present invention; and Fig. 2 is a schematic, diagrammatic view of one arrangement of processing equipment employed in practicing a preferred embodiment of the invention.

In the present invention ground, roasted coffee beans are placed in extraction columns and extracted with relatively cold water. The water entering the extraction columns is preferably cold (about 60°–70° F.) and is heated during extraction to a temperature of not much greater than 100° F. In order that the highest quality soluble coffee may be obtained, the water extraction is stopped when about 18–20% by weight of the coffee has been extracted as soluble coffee solids. This cold water coffee extract is then deaerated, somewhat concentrated, and then stored for subsequent vacuum drying.

A portion of the spent coffee grounds, from which the 18–20% of coffee solids has been removed, is then treated to remove additional soluble coffee solids by hydrolyzing the grounds to create an essentially tasteless hydrolysis product. The various steps for accomplishing this are shown diagrammatically in Fig. 1, wherein like numbers refer to like elements in Fig. 2. In the first step, coffee grounds and water are put in a mixing chamber, the ratio by weight of coffee grounds to water being approximately 1 to 8. To this mixture there is added a small amount (about 1% by weight) of an absorptive colloid, such as fuller's earth or the like, and a small amount (about 1%) of an acid catalyst. The absorptive colloid may be fuller's earth, diatomaceous earth, silica gel, activated charcoal, or other suitable filter aids having high absorptive characteristics. The acid catalyst is preferably an inorganic acid and, of the inorganic acids, sulfuric acid is preferred due to the ease with which insoluble salts may be formed therewith.

In one preferred embodiment of the invention, the various materials initially added to the mixing chamber are as set forth in the following nonlimiting example:

Example I

| | Pounds |
|---|---|
| Spent coffee grounds (65% water) | 175 |
| Water | 450 |
| Sulfuric acid (concentrated) | 5.25 |
| Fuller's earth | 5.25 |

The materials added to the mixing chamber are then thoroughly agitated so as to form an aqueous acid suspension of the coffee grounds and the absorptive colloid. This aqueous suspension is then preferably heated to a temperature of about 212° F., this temperature being maintained preferably for about an hour to achieve hydrolysis of the coffee grounds. During this hydrolysis the absorptive colloid acts to absorb undesirable taste-imparting by-products of the hydrolysis reaction. When the hydrolysis has progressed to a sufficient degree, the suspension is neutralized to a pH of about 5-6, this neutralization being preferably achieved by adding a base which is capable of forming an insoluble salt with the inorganic acid. This base preferably comprises a compound of calcium, such as lime (CaO), calcium carbonate, or the like. The neutralized aqueous suspension is then cooled, preferably to less than 100° F., so as to assist in precipitating all of the relatively insoluble solids in the suspension. At this point the suspension contains somewhat less than 10% dissolved solids. In a preferred form of the invention the above steps are preferably carried out in a single cooking pot which is jacketed to provide either heating or cooling.

The cooled aqueous suspension is then preferably centrifuged to separate a majority of the suspended solids from the dissolved hydrolysis product. The resultant liquid is then filtered, preferably through a cloth filter, to remove any minute suspended solid particles to obtain a pure solution which has substantially no taste. This solution is next concentrated, preferably to about 50-80% solids, although it may be concentrated to substantial dryness. After concentration the solution or powder, whichever is the resultant product, is added to a predetermined quantity of the cold water coffee extract to give a mixture having a ratio by weight of approximately 4 to 1 of dissolved water extract solids to dissolved tasteless solids. The resultant mixture is then preferably dried in accordance with the teachings of copending U. S. Patent No. 2,504,735 to give a soluble crystalline coffee.

Referring now to Fig. 2 there is shown one embodiment of an apparatus for accomplishing the present invention. There are provided a number of coffee extraction columns 10 in which fresh, ground, roasted coffee is placed. For simplicity, only two of these columns are illustrated, a larger number (i. e. 7-9) being usually provided. The coffee is preferably extracted by running fresh water into the most spent grounds and having it pass out of the columns through the freshest grounds. As explained previously, this is essentially a cold water extraction process which is adjusted to extract about 18-20% of the soluble coffee solids. The coffee extract obtained from the columns is next piped into a deaerator and concentrator 12, which is connected to a vacuum system of about 50 mm. Hg abs. to remove air from the extract. If desired, heat can be applied to the deaerator 12 so as to also remove some of the water from the extract. The deaerated cold water extract is then piped to a storage tank 14 which may be equipped with an agitator 15 for assuring uniform mixture of the materials therein. From the storage tank the extract mixture is pumped into a vacuum belt drier 16, of the type described more completely in copending U. S. Patent 2,504,735. In the belt drier, the extract mixture is dried to a crystalline powder in a short time under a high vacuum of about 1 mm., the crystalline powder being collected in a vacuum dolly 18.

The spent grounds from one or more of the coffee extraction columns 10 is placed into a mixing and cooking pot 20, provided with an agitator 21. It is in this cooking pot that the hydrolysis reaction is preferably accomplished. This pot 20 is preferably provided with a jacket through which steam or hot or cold water may be circulated so as to provide the desired temperature control. From the cooking pot the hydrolyzed suspension is passed to a centrifuge 22 where most of the solids are separated from the liquid solution of the hydrolyzed product. This liquid solution is then passed through a filter 24 where the finest suspended solids are removed. The resultant liquid is then placed in a concentrator 26 where it may be heated to give off any predetermined quantity of water vapor. This heating is preferably, but not necessarily, accomplished in a vacuum of about 100 mm. Hg abs. so as to assist in the removal of water vapor. From the concentrator the concentrated hydrolysis solution is then added to the storage tank 14 to give a mixture having a ratio of about 4 parts by weight of soluble coffee solids to one part by weight of tasteless solids. As explained previously, this mixture is thoroughly stirred by the agitator 15 and the resulting mixture then dried in the vacuum drier 16.

In the above process the vacuum removal of water vapor may be achieved in a number of known methods, such for example as those described by Schroeder and Schwarz in Chemical Engineering Progress, vol. 45, No. 6, June 1949, pages 370-376.

Since certain changes may be made in the above product and process without departing from the scope of the invention herein involved, it is intended that all matter contained in the above description, or shown in the accompanying drawings, shall be interpreted as illustrative and not in a limiting sense.

What is claimed is:

1. A process for producing a soluble coffee which comprises extracting soluble coffee solids from roasted, freshly ground coffee by passing through said coffee water which has a temperature not much greater than 100° F.; stopping said water extraction when about 18-20% by weight of the coffee has been extracted as soluble coffee solids; treating a portion of the extracted coffee grounds to remove additional soluble coffee solids by hydrolyzing said grounds to create an essentially tasteless hydrolysis product; said hydrolysis step comprising the steps of preparing an aqueous suspension of said extracted grounds and an absorptive colloid, acidifying said suspension by adding sulfuric acid to give a sulfuric acid concentration of about 1% by weight of the aqueous suspension, cooking said acid suspension for approximately 1 hour at about 212° F., raising the pH of said cooked suspension to approximately 5-6 by adding a basic compound which forms a relatively insoluble sulfate, cooling said suspension, centrifuging said cooled suspension to separate the majority of the solution from the suspended solids, and filtering said resultant solution to provide a substantially tasteless solution containing substantially no undissolved solids and having less than 10% dissolved solids; concentrating said tasteless solution to provide a solids concentration at least as high as that of said water extract; adding said concentrated tasteless solution to said extract to give a mixture having a ratio by weight of approximately 4 to 1 of dissolved water extract solids to dissolved tasteless solids; and drying said mixture to remove substantially all of the water therefrom.

2. A process for producing a soluble coffee which comprises extracting soluble coffee solids from roasted, freshly ground coffee by passing through said coffee water which has a temperature not much greater than 100° F.; stopping said water extraction when about 18–20% by weight of the coffee has been extracted as soluble coffee solids; treating a portion of the extracted coffee grounds to remove additional soluble coffee solids by hydrolyzing said grounds to create an essentially tasteless hydrolysis product; said hydrolysis step comprising the steps of preparing an aqueous suspension of said extracted grounds and an absorptive colloid, acidifying said suspension by adding a hydrolysis catalyst comprising an inorganic acid, cooking said acid suspension to achieve hydrolysis of a portion of said extracted coffee grounds, raising the pH of said cooked suspension to approximately 5-6 by adding a basic compound which forms a relatively insoluble salt with said inorganic acid, treating said suspension to separate the majority of the solution from the suspended solids, and filtering said resultant solution to provide a substantially tasteless solution containing substantially no undissolved solids; concentrating said tasteless solution; adding said concentrated tasteless solution to said extract to give a mixture having a ratio by weight of approximately 4 to 1 of dissolved water extract solids to dissolved tasteless solids; and drying said mixture to remove substantially all of the water therefrom.

3. A process for producing a soluble coffee which comprises extracting soluble coffee solids from roasted, freshly ground coffee by passing through said coffee water which has a temperature not much greater than 100° F.; stopping said water extraction when about 18–20% by weight of the coffee has been extracted as soluble coffee solids; treating a portion of the extracted coffee grounds to remove additional soluble coffee solids by hydrolyzing said grounds to create an essentially tasteless hydrolysis product; said hydrolysis step comprising the steps of preparing an aqueous suspension of said extracted grounds and an absorptive colloid, acidifying said suspension by adding a hydrolysis catalyst comprising an inorganic acid, cooking said acid suspension to achieve hydrolysis of a portion of said extracted coffee grounds, raising the pH of said cooked suspension to approximately 5-6 by adding a basic compound which forms a relatively insoluble salt with said inorganic acid, and treating said suspension to remove substantially all suspended solids so as to provide a substantially tasteless solution containing substantially no undissolved solids; concentrating said tasteless solution; adding said concentrated tasteless solution to said extract to give a mixture having a ratio by weight of approximately 4 to 1 of dissolved water extract solids to dissolved tasteless solids; and drying said mixture to remove substantially all of the water therefrom.

4. The process of claim 3 wherein said inorganic acid comprises sulfuric acid and said basic compound comprises a calcium compound which is capable of forming calcium sulfate.

5. The process of claim 3 wherein said inorganic acid comprises sulfuric acid and said basic compound comprises lime.

6. The process of claim 3 wherein said tasteless solution is concentrated to about 50–80% solids.

7. The process of claim 3 wherein said tasteless solution is concentrated to substantial dryness prior to addition to said extract.

8. The process of claim 3 wherein said absorptive colloid comprises fuller's earth.

PHILIP J. CLOUGH.
RICHARD S. MORSE.
EDWARD G. HELLIER.
ROBERT. A. STAUFFER.

REFERENCES CITED

The following references are of record in the file of this patent:

UNITED STATES PATENTS

| Number | Name | Date |
| --- | --- | --- |
| 2,340,758 | Kappenberg et al. | Feb. 1, 1944 |
| 2,504,735 | Swarz et al. | Apr. 18, 1950 |
| 2,518,441 | Schaeppi | Aug. 15, 1950 |